US006865163B1

United States Patent
Bergenwall et al.

(10) Patent No.: US 6,865,163 B1
(45) Date of Patent: Mar. 8, 2005

(54) DATA TRANSMISSION METHODS WITH PAYLOAD UNIT NUMBERING IN A TELECOMMUNICATION SYSTEM

(75) Inventors: Martin Bergenwall, Espoo (FI); Mikko J. Rinne, Helsinki (FI); Jukka Immonen, Espoo (FI); Mikko Ohvo, Numminen (FI); Juha Räsänen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/701,510

(22) PCT Filed: Jun. 1, 1999

(86) PCT No.: PCT/FI99/00477

§ 371 (c)(1),
(2), (4) Date: Feb. 2, 2001

(87) PCT Pub. No.: WO99/63703

PCT Pub. Date: Dec. 9, 1999

(30) Foreign Application Priority Data

Jun. 3, 1998 (FI) ................................................ 981261
Jun. 23, 1998 (FI) ................................................ 981441

(51) Int. Cl.[7] .............................................. H04B 3/20
(52) U.S. Cl. ...................... 370/288; 370/465; 714/748
(58) Field of Search ................... 370/216, 276, 370/282, 464–474; 455/8; 709/227, 228, 230; 714/100, 1, 2, 748–750

(56) References Cited

U.S. PATENT DOCUMENTS

| 4,720,829 A | * | 1/1988 | Fukasawa et al. | ........... 714/701 |
| 4,771,391 A | * | 9/1988 | Blasbalg | ..................... 709/232 |
| 4,939,731 A | * | 7/1990 | Reed et al. | .................. 714/748 |
| 5,818,852 A | | 10/1998 | Kapoor | |
| 5,949,799 A | * | 9/1999 | Grivna et al. | ................ 714/749 |
| 5,953,344 A | * | 9/1999 | Dail et al. | ................... 370/443 |
| 6,625,166 B2 | * | 9/2003 | Tsukamoto et al. | ......... 370/466 |

FOREIGN PATENT DOCUMENTS

| EP | 0635 952 | 1/1995 |
| GB | 2 266 641 | 11/1993 |
| WO | WO 96/33586 | 10/1996 |

OTHER PUBLICATIONS

Abstract, JP 6204988, Jul. 22, 1994, Moriya Masahiro.

* cited by examiner

Primary Examiner—Hassan Kizou
Assistant Examiner—D Levitan
(74) Attorney, Agent, or Firm—Pillsbury Winthrop LLP

(57) ABSTRACT

The invention relates to data transmission in telecommunication systems and particularly in radio systems. The invention employs "payload numbering" instead of or in addition to conventional frame numbering. Data (61) is split into fixed-length data blocks or payload units (62). The size of a block is preferably equal to or smaller than the shortest information field in frames (63) of the protocol(s) used. Each protocol frame carries one or more payload units. In an optimum situation the length of the information field in a protocol frame equals n * the length of the payload unit, where n is an integer. Instead of frame numbering (in some special cases possibly in addition to it) the protocol frame carries payload numbers both for indicating the payload units (data blocks) conveyed in the protocol frame and for acknowledging the received blocks.

25 Claims, 5 Drawing Sheets

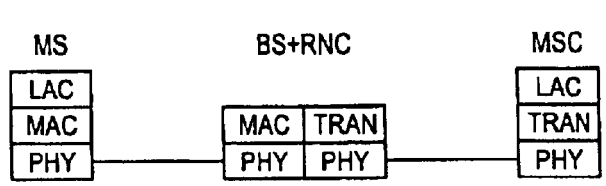
Fig. 4 (Prior art)
Fig. 5 (Prior art)
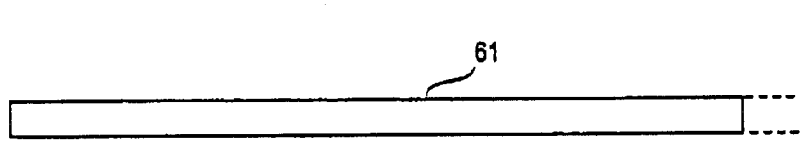
Fig. 6A Original data stream
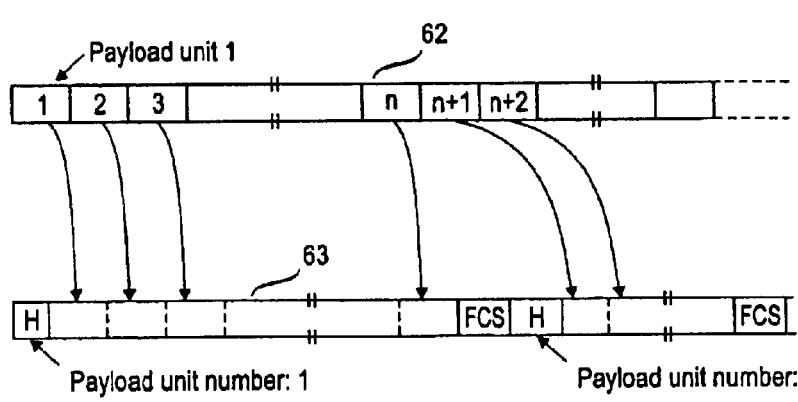
Fig. 6B Data stream split into payload units
Fig. 6C Payload units packed in frames
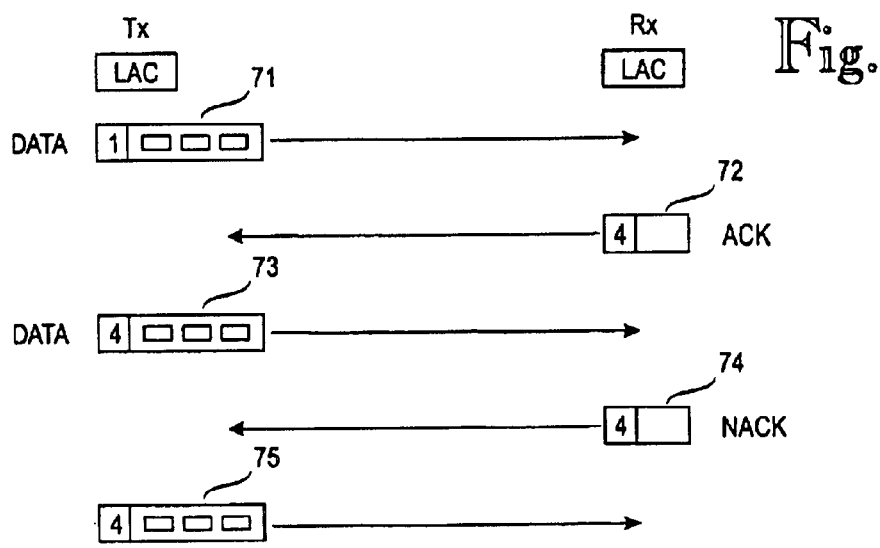
Fig. 7

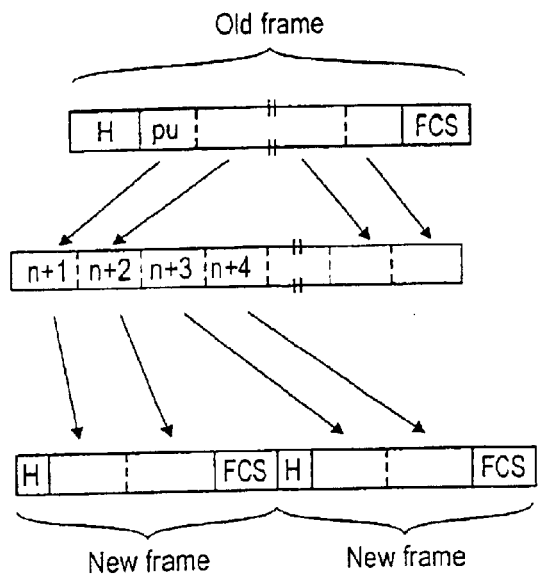
Fig. 8A
Payload units packed in "old" long frames in retransmission buffer
Fig. 8B
Payload units to be retransmitted are separated from "old" frames
Fig. 8C
and packed in "new" short frames that are transmitted
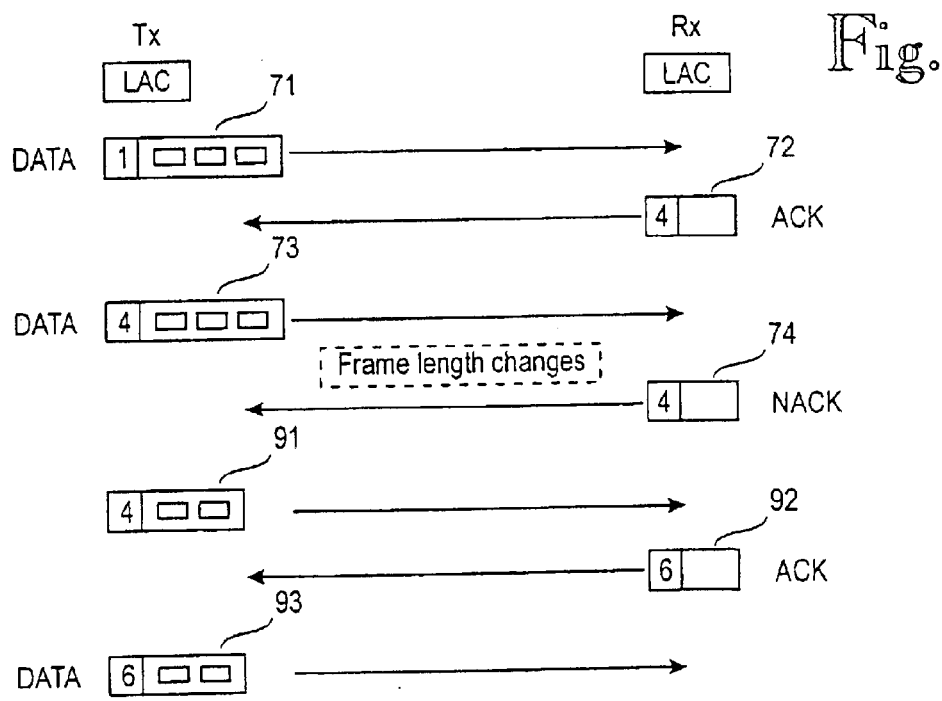
Fig. 9

DATA TRANSMISSION METHODS WITH PAYLOAD UNIT NUMBERING IN A TELECOMMUNICATION SYSTEM

This application is the national phase of international application PCT/FI99/00477 filed Jun. 1, 1999 which designated the U.S., and the international application was published under PCT Article 21(2) in English.

The invention relates to data transmission in telecommunication systems and particularly in radio systems.

Mobile communication systems generally refer to different telecommunication systems which enable personal wireless data transmission while subscribers roam in the system area. A typical mobile communication system is a Public Land Mobile Network (PLMN). First-generation mobile communication systems were analogue systems where speech or data was transferred in an analogue form similarly as in conventional public switched telephone networks. An example of a first-generation system is the Nordic Mobile Telephone (NMT).

In second-generation mobile systems, such as the Global System for Mobile Communication (GSM), speech and data are transmitted in a digital form. In addition to conventional speech transmission, digital mobile communication systems provide a plurality of other services: short messages, facsimile, data transmission, etc.

Currently under development are third-generation mobile communication systems, such as the Universal Mobile Communication System (UMTS) and the Future Public Land Mobile Telecommunication System (FPLMTS), which was later renamed as the International Mobile Telecommunication 2000 (IMT-2000). The UMTS is being standardized by the European Telecommunication Standards Institute (ETSI), whereas the International Telecommunication Union (ITU) standardizes the IMT-2000 system. These future systems are basically very similar. For example the UMTS, as all mobile communication systems, provides wireless data transmission services to mobile subscribers. The system supports roaming, which means that UMTS users can be reached and they can make calls anywhere as long as they are situated within the coverage area of the UMTS.

Services provided by mobile communication systems can generally be divided into teleservices and bearer services. A bearer service is a telecommunication service which forms signal transmission between user-network interfaces. For example modem services are bearer services. In a teleservice the network also provides subscriber terminal services. Important teleservices include speech, facsimile and videotex services. Bearer services are usually divided into groups according to a property, such as asynchronous and synchronous bearer services. Each of these groups comprises a number of bearer services, such as a transparent service (T) and a non-transparent service (NT). In a transparent service the (real-time) data to be transmitted, is unstructured and transmission errors are corrected only by means of channel coding. In a non-transparent service the (non-real-time) data to be transmitted is structured into protocol data units (PDU) and transmission errors are corrected by utilizing (in addition to channel coding) automatic retransmission protocols, i.e. retransmission of corrupted data in the data link layer. For example in the GSM system such a link protocol is called a radio link protocol (RLP). This kind of link protocol is also-generally referred to as link access control (LAC), particularly in connection with third-generation mobile communication systems.

In a retransmission protocol the data is transmitted in frames (data units), which usually comprise a frame check sequence FCS, which is calculated on the basis of the frame content. The receiver checks the content of the received frames by calculating the FCS on the basis of the content of the received frame and by comparing it with the FCS received in the frame. If the FCSs do not match, the frame is interpreted as corrupted and the receiver requests for retransmission of the frame. The receiver also requests for retransmission when the frame is missing entirely. In such a manner the radio system is able to provide a user with a data channel which has a better bit error ratio (BER) than a data channel with no retransmission protocol in use. For example in the GSM system, the basic BER (without RLP) is usually about $10^{-3}$, whereas with the use of RLP the BER is about $10^{-8}$. On the other hand, the effective data rate naturally deteriorates due to numerous retransmissions.

The retransmission protocol retransmits the entire frame whenever the FCS calculated in the receiver does not match the received FCS. This may result from an error of one bit in the frame. This speaks for the use of short frames in order that the amount of data that is possibly retransmitted as a result of bit errors can be minimized. On the other hand, each frame has a header, which contains sequence numbers for identifying the frame, and an FCS field. This overhead, in turn, speaks for longer frames in order that the overhead in the frames can be minimized. The longer the frames, the smaller the portion of the overhead with respect to the amount of the data to be transmitted. At present there are protocols which employ fixed-length data frames (such as the GSM RLP) and protocols utilizing variable-length protocols, such as Logic Link Control LLC in the packet data service GPRS of the GSM system.

Third-generation mobile communication systems may require variable-length frames of the data link layer for different reasons, for example in order to achieve optimum adaptation to changing conditions of an underlying Medium Access Control (MAC) layer and to varying radio conditions. In third-generation systems it is possible to use different MAC services with different BERs from about $10^{-3}$ to $10^{-6}$ with or without MAC layer retransmission. However, there is a problem related to adaptive changing of the frame length.

If the radio conditions deteriorate, the frame length is made shorter. The shorter the frame, the less susceptible it is to disturbance and the greater the likelihood that the frame is transmitted over the radio path without distortion. On the other hand, if the frames are very long each frame is subjected to bit errors during the transmission and the transmission only consists of retransmissions. When the frame length changes during the connection, it is likely that the transmission buffers will contain long frames waiting for retransmission. However, such long frames cannot be divided into several short frames since this would make the frame numbering meaningless and thus prevent correct operation. In other words, if long frames that have already been transmitted are retransmitted in short frames with different frame numbers, it will confuse the complicated sequences of retransmissions and retransmission requests, possibly resulting in loss or doubling of data. Therefore long frames must be retransmitted even if the optimum frame length used by the new frames may be considerably shorter.

Transfer to the use of third-generation mobile communication systems will take place gradually. At the beginning, third-generation radio access networks will be used in connection with network infrastructure of second-generation mobile communication systems. Such a hybrid system is illustrated in FIG. 1. A second-generation mobile services switching centre MSC is connected both to a second-generation radio access network, such as a GSM base station system BSS consisting of a base station controller BSC and base stations BTS, and to a third-generation radio access network consisting of, for example, a radio network controller RNC and base stations BS. In practice, there will be two different radio subsystems RSS, which share a common infrastructure on the network subsystem NSS level. Second-generation mobile stations MS (such as the GSM) communicate via the second-generation radio access network and third-generation mobile stations MS (such as the UMTS) communicate via the third-generation radio access network. Possible dual-mode phones (such as GSM/UMTS) are able to use either radio access network and to perform handovers between them.

Since a third-generation radio access network has not been designed to be compatible with a second-generation core network (NSS), it is clear that such a mixed architecture requires interworking between the networks, usually described in the form of an interworking unit IWU. A general requirement is that no modifications are allowed in the second-generation system (mobile services switching centre MSC), which means that the interface connecting, for example, the GSM MSC and the IWU should be a pure A interface. The IWU should carry out all the conversions between the second-generation and third-generation functions and formats. Since the second-generation and third-generation retransmission protocols (such as RLP and LAC) will be at least somewhat different, interworking which will probably be needed between the second-generation and third-generation rip systems is the adaptation of these different protocols to each other.

Subsequent development will lead to a situation where pure third-generation mobile communication networks exist in parallel with second-generation mobile systems or the aforementioned hybrid systems. FIG. 2 illustrates this situation.

An object in the development of third-generation mobile communication systems is supporting a handover between second-generation and third-generation mobile systems. A dual-mode mobile station should be able to roam from a second-generation radio access network to a third-generation radio access network and vice versa without a break in an ongoing call.

This object can be reached rather easily for speech calls or transparent data calls. A handover causes loss or doubling of only a few bits when traffic channel protocol stacks are being swapped. Speech does not require amendment of these few bit errors, since they only cause a momentary disturbance or no noticeable change in the received speech. In transparent data transmission, end-to-end application protocols correct single bit errors.

The situation is different when a handover is carried out for nontransparent data calls. As stated above, NT calls utilize a retransmitting link protocol, such as RLP or LAC, (in addition to channel coding) for error correction. Second-generation and third-generation protocols will be at least somewhat different. Therefore it is necessary to change the link protocol during a handover. However, in a handover there may be complicated ongoing sequences of selective retransmissions and retransmission requests in the "old" link protocol, and an interruption thereof possibly leads to loss or doubling of data. Yet, in order to maintain data integrity it is important that not one bit is lost or doubled during the swap of the traffic channel protocol stacks.

An object of the invention is to eliminate the problems related to the retransmission of old frames when the frame length of the retransmission protocol is changed during the connection.

Another object of the invention is the interworking between link layer protocols of different radio systems.

Yet another object of the invention is to develop a handover method which maintains data integrity in a handover for a non-transparent call between two mobile communication systems.

The basic idea of the invention is to utilize "payload unit numbering" instead of or in addition to conventional frame numbering. The data is split into fixed-length data blocks or payload units. The size of a block is preferably equal to or smaller than the shortest information field in the frames of the protocol(s) used. Each protocol frame carries one or more payload units. In an optimum situation the length of the information field in a protocol frame equals n * the length of the payload unit, where n is an integer. Instead of (in some special cases possibly in addition to) frame numbering the protocol frame carries payload numbers both for indicating the payload units (data blocks) transferred in the protocol frame and for acknowledgement of the received blocks.

The payload numbering according to the invention is thus based on the numbering of the units formed from the data content, wherefore it is independent of the frame length and the frame type, i.e. the used protocol. This provides considerable advantages.

By means of the payload numbering it is possible to avoid the aforementioned problems related to changing the length of the protocol frame. After the frame length has changed, the transmitter splits the "old" frames in the retransmission buffer back into payload units, packs these payload units into "new" frames and indicates with payload numbering in the header of the new frame which payload units the frame contains (e.g. by indicating the number of the first payload unit in the frame). The receiver identifies the change in the frame length (e.g. from the frame header) and the payload numbers (both the numbers sent for identification of the received frames and the numbers sent for acknowledgement) from the frame header similarly as before the change of the frame length. The retransmission sequences are not disturbed as a result of the change in the frame length since the payload numbering is the same as before the change. The only thing that changes is the frame capacity, i.e. the number of payload units transferred in one frame. Therefore the invention optimizes the performance of a non-transparent data traffic channel under varying radio and error conditions.

By means of the payload unit numbering it is also possible to improve the interworking of link layer protocols between two different radio systems. The length of the payload unit can be selected optimally regarding the protocols used by both systems. For example, the length of the payload unit can be negotiated at the start of each connection in the same way as all the other link layer parameters, or the length can be indicated directly or indirectly in connection with signalling, or the length can be fixed. In an embodiment of the invention, a radio access network (e.g. a third-generation radio access network) where the protocol (e.g. LAC) allows changing the frame length is connected to another radio system (e.g. a second-generation radio system) where the protocol (e.g. RLP) frame has a fixed length. The length of the payload unit can be selected to be identical to the length of the information field in the RLP frame, in which case each RLP frame carries one payload unit and the payload numbering is directly compatible with the RLP frame numbering. Therefore the same numbering applies over the entire connection for example between the mobile station and the mobile services switching centre even though the connection comprises two legs with different layer 2 link protocols and even different frame lengths. This simplifies the implementation of the interworking between the systems since the interworking does not have to adapt two different frame numbering systems to each other, but it only attends to the adaptation of the different protocol functions and formats and to the transmission of information (user data and protocol commands and responses). If either protocol does not support a particular protocol function, the interworking unit can deactivate the function for example by means of negative acknowledgement when the link parameters are being negotiated at the beginning of the connection. Also, the same numbering from end to end enables handovers without loss or doubling of data. Alternatively, the length of the payload unit can be selected such that the frame of the first protocol (e.g. third-generation LAC) can be transmitted through a channel of the second radio system instead of the second protocol (e.g. RLP) frame or in the information field thereof. In this case, too, the same numbering is applied from end to end, which provides several advantages. The invention also makes it possible to change the frame length at the radio interface in steps of a payload unit even though the frame length at the network interface between the mobile services switching centre and the interworking unit stays the same. Therefore the frame length at the radio interface can be adapted to radio conditions, error conditions, etc.

The payload units are numbered preferably in ascending order. Therefore, under normal conditions it is sufficient that the payload units in the frame are identified with one payload unit number (e.g. the number of the first payload unit). In such a case the invention causes no or only minimum overhead. A different situation occurs when the data rate is changed from a lower to a higher rate or vice versa, and the higher data rate is not an even multiple of the lower data rate. In such a case there may be scattered payload units (which are no longer in the original sequence), which must be retransmitted. According to an embodiment of the invention, in these less than optimum situations the payload unit number is indicated in the frame separately for each payload unit by means of so-called header extension. This means a temporary increase in overhead. However, these situations are rare since only about 5 to 10% of the frames are assumed to be retransmitted and only a fraction of these will be out of sequence and subject to changes of data rate.

The invention will be described below in greater detail in connection with preferred embodiments, with reference to the accompanying drawings, in which FIG. 1 shows a second-generation mobile communication network supplemented with a third-generation radio access network;

FIG. 4 shows protocol layers of a third-generation mobile system in another manner;

FIG. 5 illustrates a basic structure of an LAC frame;

FIGS. 6A to 6C illustrate payload unit numbering according to the invention;

FIG. 7 illustrates data transmission and retransmission based on payload numbering;

FIGS. 8A, 8B, 8C and 9 illustrate the retransmission according to the invention when the frame length changes;

Figure 1:
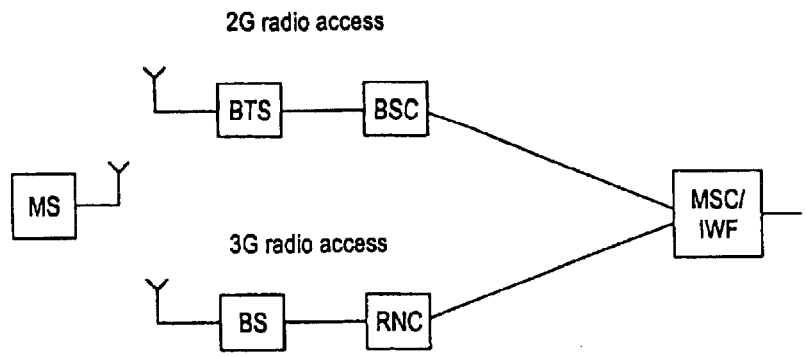
Figure 2:
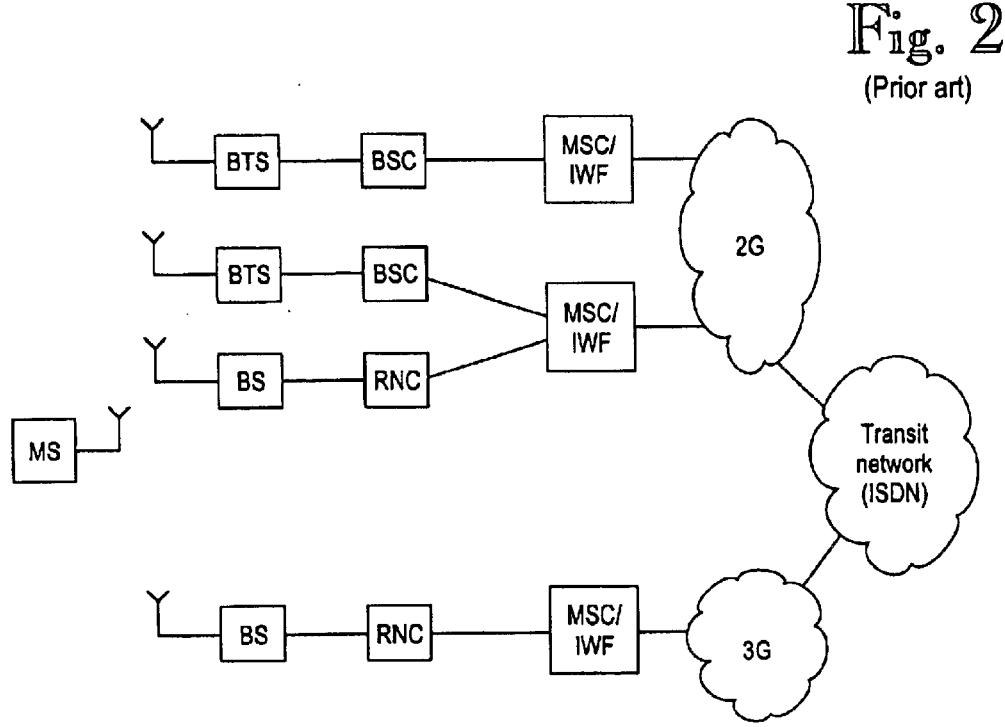
FIG. 2 shows a second-generation and a third-generation network between which dual-mode mobile stations can roam.

The present invention can be applied in any telecommunication system with a link protocol frame of variable length, or in interworking or handover between any two digital radio systems with different radio link protocols. "Radio system" should be understood broadly such that different radio access networks of the same mobile network are able to form different radio systems, as illustrated in FIG. 1, or that radio systems refer to entirely separate mobile communication systems, as shown in FIG. 2. One or both of the radio access networks can be wireless local loop (WLL) or radio local loop (RLL) networks. The primary field of application of the invention is a handover between a second-generation and a third-generation mobile network, such as the GSM and the UMTS. "Link protocol" should also be understood herein generally to cover not only the present second-generation protocols, such as the RLP of the GSM system, but also all the possible third-generation or later generation link access control (LAC) protocols or the radio link control protocol (RLCP) of the Wideband CDMA system, or also lower-layer retransmission protocols, such as the medium access control (MAC). In the following, the preferred embodiments of the invention will be described by using as an example the second-generation GSM system and the third-generation UMTS. In the description below, the GSM radio link protocol will be called RLP and the UMTS radio link protocol will be called LAC.

A GSM network consists of two basic parts: a base station system BSS and a network subsystem NSS. The BSS and the mobile stations MS communicate via radio connections. In the BSS, each cell is served by a base station BTS. A number of BTSs are connected to a base station controller BSC the function of which is to control radio frequencies and channels used by a BTS. The BSCs are connected to a mobile services switching centre MSC. Certain MSCs are connected to other telecommunication networks, such as the public switched telephone network PSTN, and they comprise gateway functions for calls terminating at and originating from these networks. These MSCs are known as gateway-MSCs (GMSC). There are also at least two databases: a home location register HLR and a visitor location register VLR.

A mobile communication system comprises adapter functions for adapting an intra-network data link to the protocols used by terminal equipments and other telecommunication networks. The adapter functions typically include a terminal adaptation function TAF placed at the interface between a mobile station and a data terminal equipment connected thereto, and an interworking function IWF situated at the interface between the mobile and network and another telecommunication network, usually in connection with an MSC. In the GSM system a data link is set up between a TAF of the MS and an IWF in the mobile network. The TAF adapts a data terminal equipment DTE connected or integrated to the MS to the aforementioned GSM data link that is set up over a physical connection using one or several traffic channels. The IWF connects the GSM data link for example to another telecommunication network, such as an ISDN or another GSM network, or to some other transit network, such as a PSTN.

Figure 3:
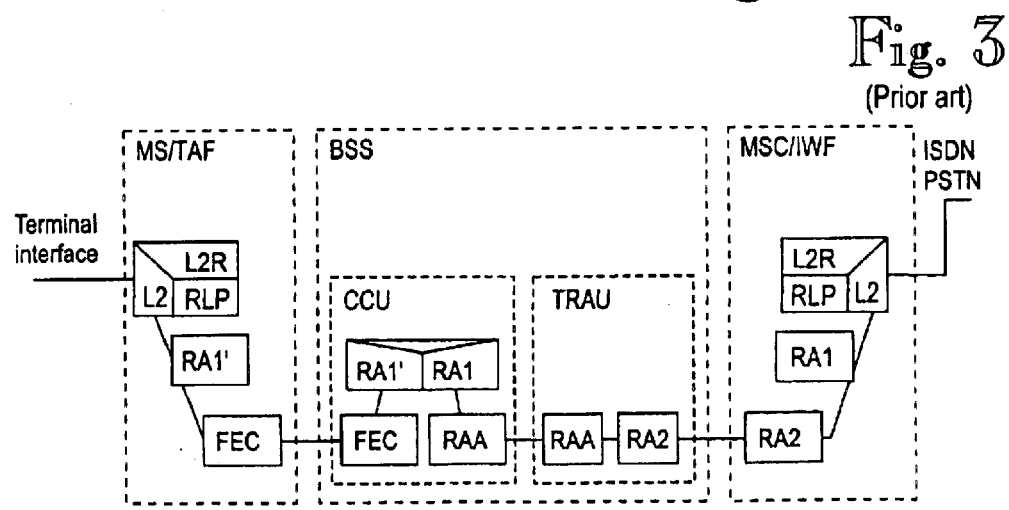
FIG. 3 shows a protocol stack of a non-transparent data service in the GSM system.

FIG. 3 illustrates protocols and functions required for nontransparent bearer services. A non-transparent circuit switched connection between a TAF and an IWF on a GSM traffic channel comprises several protocol layers that are common to all these services. They include different rate adaptation RA functions, such as RA1' between the TAF and a channel codec unit CCU placed in the BSS, RA1 between the CCU and the IWF, RAA (or RAA' for a 14.4 kbit/s channel) between the CCU and a transcoder unit TRAU placed remote from the base station, and RA2 between the TRAU and the IWF. The rate adaptation functions RA are defined in the GSM recommendations 04.21 and 08.20. Communication between the CCU and the TRAU is defined in the GSM recommendation 08.60. Information that has been RA1' rate-adapted in the radio interface is also channel-coded as defined in the GSM recommendation 5.03, which is illustrated by blocks FEC in the MS and the CCU. The IWF and the TAF also comprise higher-level protocols that are specific to each service. In an asynchronous non-transparent bearer service the IWF requires an L2R (Layer 2 Relay) protocol and a radio link protocol RLP and a modem or a rate adapter towards the fixed network. The L2R functionality for non-transparent character oriented protocols is defined for example in the GSM recommendation 07.02. The RLP is defined in the GSM recommendation 04.22. The RLP is a frame-structured, balanced (HDLC-type) data transmission protocol, where error correction is based on retransmission of distorted frames at the request of the receiving party. The interface between the IWF and for example an audio modem MODEM is as defined in CCITT V.24 and it is denoted in FIG. 3 by L2. This non-transparent configuration is also used to access the Internet.

The RA1 and RA1' rate adaptations map each 240-bit RLP frame into four modified 80-bit V.110 frames (between the MSC and the BSS) or into four modified 60-bit V.110 frames (at the radio interface). A bit sequence called "Frame Start Identifier" is used to indicate which V.110 frame in the bit stream is the first one for a particular RLP frame. The first quarter of the RLP frame is transmitted in this V.110 frame, the second quarter is transmitted in the next frame, the third quarter in the third frame and the fourth one in the fourth frame, whereafter a new RLP frame begins.

In the HSCSD concept of the GSM system, a high-speed data signal is divided into separate data streams, which are then transmitted via N subchannels (N traffic channel time slots) at the radio interface. When the data streams have been divided they are conveyed in the subchannels as if they were mutually independent until they are again combined in the IWF or the MS. However, logically these N subchannels belong to the same HSCSD connection, i.e. they form one HSCSD traffic channel. According to the GSM recommendations dividing and combining a data stream are carried out in a modified RLP, which is thus common to all the subchannels. Below this common RLP each subchannel comprises separately the same protocol stack RA1'-FEC-FEC-RA1'-RAA-RAA-RA2-RA2-RA1, which is shown in FIG. 3 for one traffic channel between the MS/TAF and the MSC/IWF. Therefore an HSCSD traffic channel according to the GSM recommendations will still use the common RLP for the different subchannels even though the bit rate on a single subchannel can be as high as 64 kbit/s.

An example of a third-generation network is the UMTS, which is still under development. It should be noted that the detailed structure of the UMTS access network is not significant for the invention. According to the simplest scenario the UMTS is an access network the functions of which are strictly limited to radio access functions. Therefore it mainly comprises functions for controlling radio resources (handover, paging) and for controlling bearer services (radio network service control). The more complicated functions, such as registers, register functions, mobility management and location management, are placed in a separate network subsystem NSS or in the core network. The NSS or the core network may be, for example, the GSM infrastructure. In FIGS. 1 and 2 the third-generation radio access network comprises base stations BS and a radio network controller RNC. It is further assumed that the third-generation system employs the link access control LAC protocol between the MS and the MSC/IWF, the protocol differing from second-generation radio link protocols, such as the RLP. A physical traffic channel comprises lower protocols, in the frames of which the LAC frames are transmitted. In principle a protocol stack of a third-generation mobile communication system may be similar as described above in connection with the GSM system, except that RLP is replaced with LAC.

FIG. 4 illustrates in another manner protocol layers of a pure third-generation mobile communication system. The LAC protocol extends from end to end between an MS and an MSC. At the radio interface between the MS and the BS/RNC there is MAC (Medium Access Control) and a physical layer (radio channel) below the LAC. At the network interface between the BS/RNC and the MSC there is a transmission layer and a physical layer (transmission channel) below the LAC. FIG. 5 shows a basic structure of an LAC frame comprising a fixed-length header, a variable-length information field, and a fixed-length frame check sequence FCS. It is possible that in third-generation systems the LAC throughput is optimized under varying radio conditions by manipulating the length of the LAC frame. Generally, there can be two reasons for changing conditions: different radio environments and different MAC bearer services. At the start of a connection it is possible to use for optimum frame size a default value based on connection parameters. During the connection it is possible to monitor the quality of the data transmission, for example the frame error ratio (FER). If the FER drops below a predetermined limit indicating good conditions, the frame size is increased. If the FER exceeds another predetermined limit, the frame size is decreased. With such an arrangement the LAC tries to optimize the frame size for the radio conditions and bit error ratio in each case. However, there may be specified maximum and minimum values for the frame size, depending on the bit rate. If the data is not transmitted sufficiently rapidly for some reason, the actual frame size can be smaller than the optimum frame size in order to avoid delays. The MAC layer can also indicate the present conditions, thus helping the LAC to adapt more rapidly. The optimum frame size can be the same or different for different transmission directions, which means that both ends are able to negotiate the optimum frame size or each end uses its own optimum frame size. It should be noted that the arrangement described above is only a scenario of the inventors concerning the adjustment of the frame length. It is not essential to the invention how the frame length is changed. The invention can also be applied in situations where the frame length is fixed or agreed upon only at the start of the connection.

FIGS. 6A to 6C illustrate the payload unit numbering according to the invention. A transmitter splits a data stream 61 to be transmitted into fixed-length data blocks or payload units 62. The size of the payload unit 62 is preferably equal to or smaller than the shortest information field in the frames of the used protocol(s), such as the LAC. The transmitter and/or the receiver obtains the length of the payload unit directly or indirectly from outband or inband signalling. The length can also be negotiated at the beginning of the connection or again during the connection. The payload units 62 are inserted into the information field of LAC frames 63. Therefore each LAC frame 63 carries one or more payload units 62. In an optimum situation the length of the information field in the LAC frame 63 equals n * the length of the payload unit 62, wherein n is an integer. For example in FIG. 6C, the LAC frames comprise n payload units. Each LAC frame 63 further comprises a frame check sequence FCS. Instead of frame numbering the LAC frame carries in the header field H the payload unit numbering indicating which payload units are transferred in the information field of the LAC frame. In the example shown in FIG. 6C, the numbering in the header field, i.e. a so-called transmission number, indicates that in addition to the number of the first payload unit 62, e.g. number 1, the header of the LAC frame can contain the data that the information field of the LAC frame comprises n payload units. The receiver can also conclude itself the number of the payload units in the frame, it can know the number in advance or it can receive information in some other manner. On the basis of the transmission number and the information on the number of payload units, the receiver is able to calculate the numbers of the other payload units in the frame, if necessary, and the number of the next payload unit it wants. The receiver can transmit this next number, i.e. a so-called reception number, in acknowledgement to the transmitter if the LAC frame was received successfully. As a result of the acknowledgement the transmitter transmits the requested payload unit and n−1 next payload units in the next LAC frame. If the FCS indicates that the content of the received LAC frame was faulty or if the frame is missing entirely, the receiver can request for retransmission of the entire LAC frame by sending in acknowledgement the transmission number given in the faulty frame. If it can be concluded from the FCS that the faulty bit is in the kth payload unit (where k is an integer and k∈n), the receiver can transmit the number of this corrupted payload unit in acknowledgement in an embodiment of the invention. As a result of the acknowledgement the transmitter retransmits the requested payload unit and (n−k+1) following payload units together with (k−1) new payload units in the next LAC frame. If the data transmission is bidirectional, the above-described operation can take place in both transmission directions. In such a case the header H of the LAC frames 63 may contain both a transmission number for one transmission direction and a reception number for the other transmission direction. Further, it is possible to use windowing with the payload numbers similarly as in the protocols based on frame numbers.

FIG. 7 shows an example of data transmission and retransmission based on the payload numbering according to the invention. A transmitter Tx transmits an LAC frame 71, which comprises three payload units, numbers 1, 2 and 3, and it stores the LAC frame 71 or only the payload units 1 to 3 in a retransmission buffer. The header of the LAC frame 71 indicates the number of the first payload unit, i.e. number 1. A receiver Rx receives the LAC frame without errors and transmits an LAC acknowledgement frame 72, where the header indicates the number of the next desired payload unit, i.e. number 4. The transmitter Tx transmits the next LAC frame 73, which contains payload units 4, 5 and 6, and it stores the LAC frame 73 or only payload units 4 and 5 in the retransmission buffer. The reception of the entire LAC frame 73 fails and the receiver Rx transmits: an LAC acknowledgement frame 74 where payload unit 4 is again requested for. The transmitter Tx retransmits payload units 4, 5 and 6 in an LAC frame 75, FIGS. 8A, 8B and 8C illustrate how a transmitter Lx processes frames to be retransmitted when the frame length is changed during the connection. FIG. 8A shows an "old" frame in the transmission buffer, comprising n payload units. After the frame length has changed, the transmitter Tx splits the "old" frame back into-payload units (FIG. 8B) and packs the payload numbers into "new" frames, each of which comprises two payload units (FIG. 8C). The payload numbering in the header of the new frame indicates which payload units the new frame comprises.

FIG. 9 shows an example of the data transmission and retransmission according to the invention, based on payload numbering, when the frame length changes in the middle of the transmission. LAC frames 71 to 74 are transmitted in the same manner as in FIG. 7. After LAC frame 73 has been transmitted, the frame length is shortened such that only two payload units are transmitted in one new frame instead of the old three units. After the frame length has changed, the transmitter Tx receives an acknowledgement frame 74 requesting for retransmission of payload units 4 to 6. The transmitter Tx unpacks the old LAC frame 73 as shown in FIG. 8 and inserts payload units 4 and 5 into a new LAC frame 91, which is transmitted to the receiver Rx. The receiver Rx acknowledges with an LAC-frame 92, where payload unit 6 is requested for next. The transmitter Tx transmits an LAC frame 93 containing the payload unit 6 to be retransmitted and a new payload unit 7. The retransmissions could thus be carried out without interference to the retransmission sequences as a result of the changed LAC frame length, since the payload numbering and the modes of the transmitter and the receiver remain the same after the change. The only thing that changes is the LAC frame throughput, i.e. the number of the payload units transferred in one LAC frame.

Figure 10:
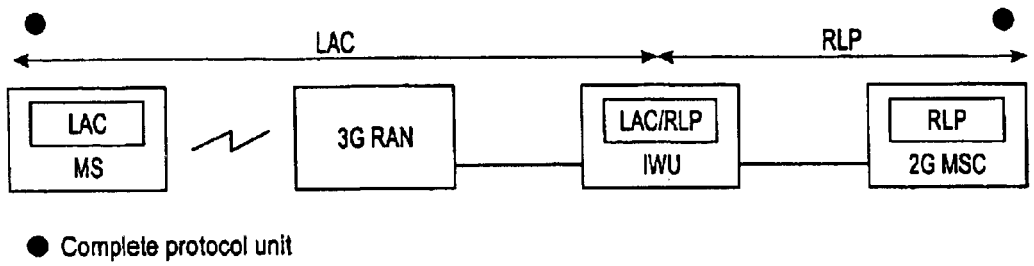
FIG. 10 shows a mobile communication system where a third-generation radio access network is connected to a second-generation mobile services switching centre.

By means of the payload numbering it is also possible to improve the interworking of link layer protocols between two different radio systems. FIG. 10 shows a mobile communication system where a third-generation radio access network is connected to a second-generation mobile services switching centre MSC. The radio access network supports the link access control LAC protocol and the MSC supports the radio link protocol RLP. Between the radio access network and the MSC there is an interworking function described in the form of an interworking unit IWU. The LAC protocol is applied between the MS and the IWU. The RLP protocol is applied between the IWU and the MSC. The IWU comprises an LAC/RLP function which understands both the LAC and the RLP formats and converts the transmission formats and functions between the LAC and the RLP. If a particular function is supported by only one of the protocols, the IWU preferably deactivates such a function during the protocol negotiations. Therefore all the functions operate from end to end between the MS and the IWU.

According to the invention, the LAC frames carry data in fixed length payload units, as described above. Also, the retransmission mechanism between the MS and the IWU is based on payload numbering and not on LAC frame numbering. The length of a payload unit equals the length of an information field in an RLP frame. This means that one RLP frame carries one payload unit. When the retransmission mechanism between the IWU and the MSC employs conventional RLP numbering, the payload numbering is directly compatible with the RLP frame numbering. Therefore the same numbering applies-over the entire connection between the MS and the MSC despite two different protocols. In other words, the RLP and the LAC process the same sequence numbers (the sequence numbers are synchronized)

even though the LAC frames can be longer than the RLP frames. The IWU does not independently acknowledge the data it has received from the MS or the MSC, but it only performs a format conversion and forwards the information to the receiver, regardless of whether the information is user data, acknowledgements or protocol commands/responses.

Figure 11:
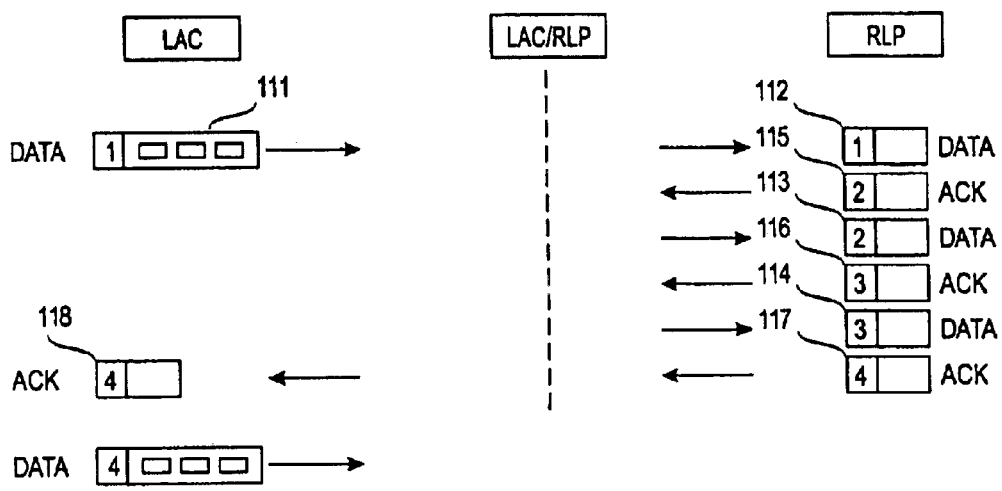
FIG. 11 shows data transmission in the system of FIG. 10 when payload unit numbering is used.

FIG. 11 illustrates the data transmission according to the invention in a network configuration of the type shown in FIG. 10. An MS transmits an LAC frame 111 comprising three payload units, numbers 1 to 3. The header of the frame 111 indicates that the first payload unit is number 1. The IWU receives the LAC frame 111, unpacks payload units 1 to 3 from the frame 111 and packs them into three RLP frames 112, 113 and 114, the frame numbers of which are correspondingly 1, 2 and 3. The RLP frames are inserted into a transmission buffer. The IWU transmits the first RLP frame (frame number 1) to the MSC. The MSC acknowledges successful reception with an RLP frame 115, where frame number 2 is requested for next. Since such a frame is found in the transmission buffer, the IWU transmits a second RLP frame (frame number 2) to the MSC. The MSC acknowledges successful reception with an RLP frame 116, where frame number 3 is requested for next. Since such a frame is found in the transmission buffer, the IWU transmits a third RLP frame (frame number 3) to the MSC. The MSC acknowledges successful reception with an RLP frame 117, where frame number 4 is requested for next. This exchange of RLP frames is shown without the use of windowing, but the changes it causes in the operation are evident to those skilled in the art. In the windowing the IWU transmits for example all the RLP frames 112 to 114 one after another (the size of a window is three or more RLP frames) and the MSC only transmits one RLP acknowledgement frame 117. Since frame number 4 is not found in the transmission buffer, the IWU converts the RLP acknowledgement frame 117 into an LAC acknowledgement frame 118, where the header contains a request for payload unit 4. The MS transmits a new LAC frame where the information field contains payload units 4 to 6 and the header contains payload unit number 4. The IWU stores the RLP frames in the retransmission buffer until it receives acknowledgement from the MSC. If, at some point, the MSC transmits an RLP frame requesting for the retransmission of a frame, the IWU transmits the requested frame from its retransmission buffer.

By means of the arrangement according to the invention it is possible to avoid problems in handovers even if the IWU changes since the protocols stay the same at the connection end points (the MSC and the MS) and there is no need to reset protocol state machines. Both the MS and the MSC know which frames have already been received and acknowledged.

Figure 12:
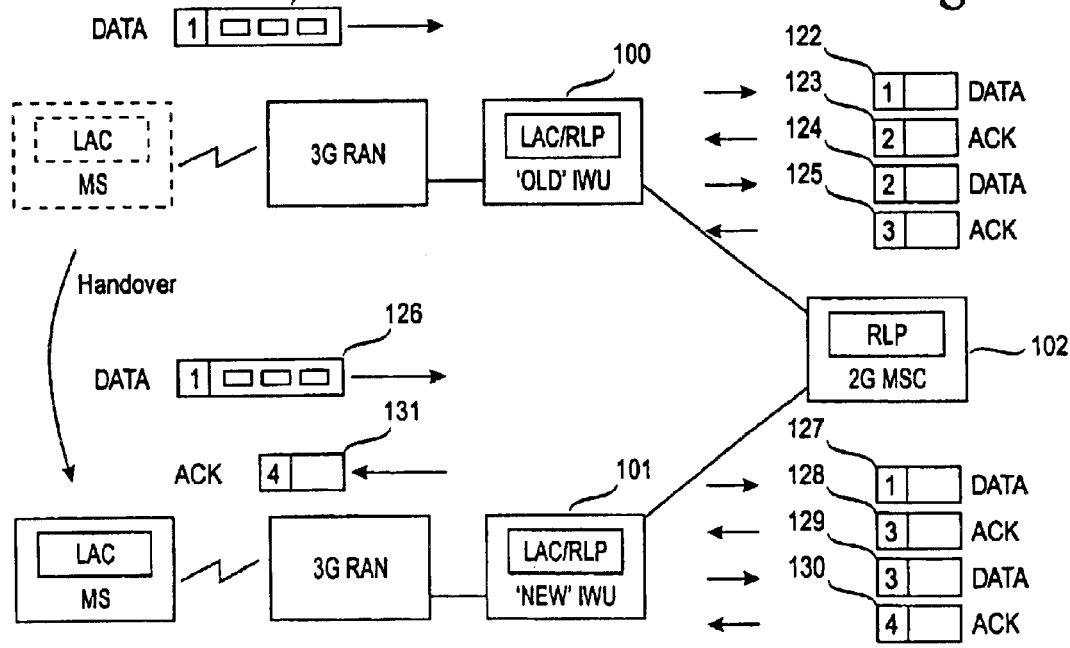
FIG. 12 illustrates a handover according to the invention during the transmission of an LAC frame.

FIG. 12 shows an example where an MS is handed over from the "old" IWU to the "new" IWU during the transmission of an LAC frame. The start resembles FIG. 11. The MS transmits to the old IWU an LAC frame 121 containing three payload units, numbers 1, 2 and 3. The IWU 100 converts the LAC frame into RLP format and transmits a first RLP frame 122. The MSC transmits positive acknowledgement 123 and the IWU transmits a second RLP frame 124. The MSC also acknowledges this frame (125). Now the MS is handed over to a base station which is connected to the "new" IWU 101, and the RLP connection is set up to the new IWU 101. Therefore the MSC does not receive RLP frame number 3 and the new IWU, 101 does not receive acknowledgement for the third RLP frame. Since the MS does not receive within a predetermined time acknowledgement for payload units 1 to 3 that were transmitted in the LAC frame, an LAC timer expires and the MS retransmits the payload units in an LAC frame 126 to the new IWU 101. The new IWU 101 converts the LAC frame 126 into RLP format and transmits a first RLP frame 127. The sequence number of the first RLP frame 127 is the same as the number of the first payload unit in the LAC frame, i.e. 1. The MSC now knows that it has already received RLP frames 1 and 2 via the old IWU and it requests with an RLP acknowledgement frame 128 the new IWU to transmit RLP frame number 3. The new IWU 101 transmits an RLP frame 129, i.e. frame number 3, and the MSC transmits an RLP acknowledgement frame 130 where frame number 4 is requested for next. Since the IWU does not comprise this frame, the IWU converts the RLP frame 130 into an LAC frame 131; which contains a request to transmit payload unit 4. The LAC frame 131 thus acknowledges the LAC frame 126. The handover was thus carried out without the doubling or loss of user data.

Figure 13:
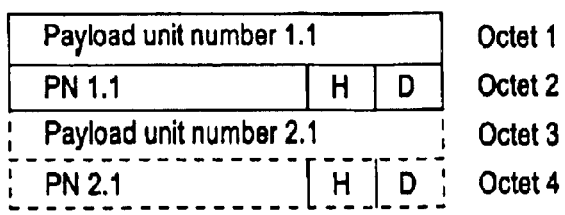
FIG. 13 illustrates an extendible header of a protocol frame.
Figure 14:
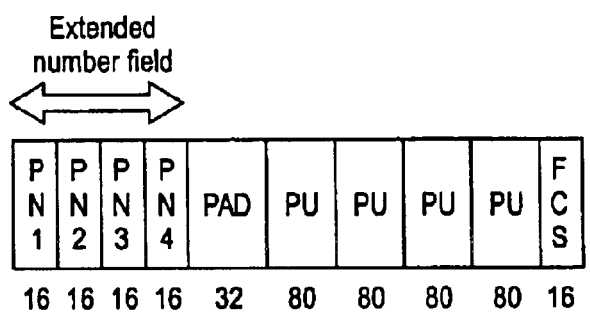
FIG. 14 shows a frame where the header comprises individual numbers of four payload units.

In a preferred embodiment of the invention, a header of a frame only comprises one payload number indicating the first payload unit contained in the frame. This is sufficient and minimizes the overhead under normal circumstances. However, in special situations, such as when the data rate changes, it may be necessary to indicate in the frame header the numbers of all the payload units. In the invention this can be implemented by extending the frame header, as illustrated by examples in FIGS. 13 and 14, FIG. 13 shows a payload number field of a frame (e.g. an LAC frame), which can be extended. The length of the basic field is 16 bits (octets 1 and 2). The payload number (PN) is 14 bits. An H flag indicates whether the header extension is used or not. If the H flag is 0, the header ends in this octet and the next two octets (3 and 4) comprise data (i.e. the beginning of the first payload unit). If the H flag is 1, the next two octets (3 and 4) contain a new payload number. In an embodiment of the invention these additional payload numbers replace the first payload unit. A D flag (data segmentation extension) indicates whether the first payload unit comprises data segmentation information. If the D flag is 1, the first payload unit comprises segmentation information. If the D flag is 0, the first data unit comprises data. The data is typically divided (segmented) into payload units as a continuous flow and it can also be restored by placing the payload units one after another in numerical order. The data segmentation-information is required if the data is segmented in an unusual manner.

Normally the payload unit number field only contains octets 1 and 2 (H=0) indicating the number of the first payload unit in the frame.

Under special circumstances, for example when the data rate changes, it may be necessary to retransmit a few payload units "out of sequence" in one or more frames, which means that the payload units in the frames do not have successive numbers. According to an embodiment of the invention, the number field of the header is then extended by one or more numbers. This means that in the last number field H=0 and in the other fields H=1. FIG. 14 shows an example of a frame with four individually numbered payload units which take the space of five payload units. Padding PAD (e.g. zerofill) is used to adapt the frame size into a multiple of the basic structure. In FIG. 14 the size of the payload unit is 80 bits, the FCS is 16 bits and the basic header is 16 bits. The extended header is 16+3*16=64 bits. The padding PAD is 32 bits (80−3*16), wherefore the frame size corresponds to a basic frame comprising four payload units. Normally the frame size changes when the number of the payload units is altered, in which case the frame size is 16+16+n*80 bits, where n is the number of the payload units. By means of the padding PAD also the length of a frame with an extended header is a multiple of the basic frame.

It is obvious that as the technology develops the basic idea of the invention can be implemented in several different manners. Therefore the invention and the embodiments thereof are not restricted to the examples described above, but they may vary within the scope of the claims.

What is claimed is:

1. A data transmission method in a telecommunication system, the method comprising:
   splitting data to be transmitted into fixed-length payload units provided with payload numbers in order to distinguish the payload units from one another,
   inserting one or more payload units into an information field of each protocol frame of a link protocol provided with a retransmission mechanism,
   providing a header field of a protocol frame with payload numbering, which indicates the payload units contained in the information field of the protocol frame,
   transmitting the protocol frame from a transmitting end to a receiving end,
   acknowledging payload units which have been received appropriately, requesting transmission of new payload units or requesting retransmission of payload units which have not been received appropriately by means of said payload numbers,
   using data block numbering in said retransmission mechanism,
   changing the length of the protocol frame during a connection, and
   inserting the payload units to be retransmitted into one or several protocol frames with a new frame length, said payload units having been transmitted for the first time before the frame length was changed.

2. A method according to claim 1, further comprising:
   unpacking payload units from protocol frames having a previous frame length and being contained in a retransmission buffer, at the transmitting end after the frame length has been changed.

3. A method according to claim 1, wherein said link protocol provided with a retransmission mechanism is a layer 2 link protocol or a protocol situated below a layer 2 link protocol.

4. A method according to claim 3, wherein the layer 2 link protocol is a radio link protocol, a link access control protocol or a radio link control protocol.

5. A method according to claim 3, wherein the protocol situated below a layer 2 link protocol is medium access control.

6. A method according to claim 1, further comprising:
   indicating in the header of the protocol frame in a normal situation the payload number of only one payload unit contained in the information field, and
   indicating in the header of the protocol frame the payload number of every payload unit in the information field individually, when payload units with unsuccessive numbers are retransmitted in the protocol frame in a special situation.

7. A method according to claim 6, further comprising:
   indicating said individual payload numbers in a frame header extension at the beginning of said information field.

8. A method according to claim 6, wherein said special situation is a change in data rate.

9. A data transmission method in a mobile communication system comprising a mobile services switching centre with a first link protocol having a fixed frame length, the first link protocol provided with a retransmission mechanism for nontransparent data transmission; a radio access network with a second link protocol provided with a retransmission mechanism for non-transparent data transmission, a frame length of the second protocol being variable or a frame thereof being longer than a frame of the first protocol; and an interworking unit via which the radio access network is connected to the mobile services switching centre, the method comprising:
   transmitting data in frames of the first link protocol between the interworking unit and the mobile services switching centre,
   using frame numbering in said retransmission mechanism of the first link protocol between the interworking unit and the mobile services switching centre,
   transmitting data in frames of the second link protocol between the mobile station and the interworking unit,
   transmitting data in the information fields of the second link protocol frames in the form of data blocks which are numbered, the length of each of said data blocks being equal to the length of the information field of a first link protocol frame, and
   using said data block numbering in said retransmission mechanism of the second link protocol between the interworking unit and the mobile station, said data block numbering being directly compatible with the frame numbering used between the interworking unit and the mobile services switching centre.

10. A data transmission method in a mobile communication system comprising a mobile services switching centre with a first link protocol having a fixed frame length, the first link protocol provided with a retransmission mechanism for nontransparent data transmission; a radio access network with a second link protocol provided with a retransmission mechanism for non-transparent data transmission, the frame length of the second protocol being variable; and an interworking unit via which the radio access network is connected to the mobile services switching centre, the method comprising:
   transmitting data in frames of the first link protocol between the interworking unit and the mobile services switching centre,
   transmitting data in frames of the second link protocol between the mobile station and the interworking unit,
   transmitting data in information fields of the second link protocol frames in the form of data blocks which are numbered,
   selecting a length of a data block such that the frame length of the second link protocol is equal to or smaller than the length of the first link protocol frame or information field,
   transmitting the frames of the second link protocol in place of the frames of the first link protocol or in the information fields thereof between the interworking unit and the mobile services switching centre, and
   using said data block numbering in the retransmission mechanism of the second link protocol over an entire connection between the mobile station and the mobile services switching centre.

11. A telecommunication system comprising a transmitter and a receiver and a link protocol provided with a retransmission mechanism, the transmitter and the receiver being arranged to transmit data in frames of the link protocol from a transmitting end to a receiving end, wherein the data is placed in information fields of the protocol frames in fixed-length data blocks which are numbered, and said retransmission mechanism is arranged to utilize said data block numbering, and the length of a protocol frame can be changed during a connection, and the transmitter is arranged to insert payload units to be retransmitted into one or several protocol frames with a new frame length in response to the changing of the frame length, said payload units having been transmitted for the first time before the frame length was changed, and wherein the information field of each protocol frame comprises one or more data blocks and a header field of a protocol frame is provided with payload numbering indicating the payload units in the information field of the protocol frame.

12. A system according to claim 11, wherein the receiver is arranged to acknowledge appropriately received payload units, to request transmission of new payload units or to request retransmission of inappropriately received payload units by means of said payload numbers.

13. A system according to claim 11, wherein the transmitter is arranged to unpack payload units from protocol frames having a previous frame length and being contained in a retransmission buffer, in response to the changing of the frame length.

14. A system according to claim 11, wherein said link protocol provided with a retransmission mechanism is a layer 2 link protocol or a protocol situated below a layer 2 link protocol.

15. A system according to claim 11, wherein the length of a payload unit can be obtained either directly or indirectly from inband or outband signalling.

16. A system according to claim 11, wherein the length of a payload unit can be negotiated at the beginning of the connection and/or during the connection.

17. A system according to claim 11, wherein
the header of the protocol frame normally contains the payload number of one payload unit in the information field, and
the header of the protocol frame contains the individual payload number of each payload unit in the information field when payload units with unsuccessive numbers are retransmitted in the protocol frame in a special situation.

18. A system according to claim 17, wherein the header of the protocol frame can be extended to the beginning of the information field in order to indicate said individual payload numbers.

19. A mobile communication system comprising a mobile services switching centre with a first link protocol provided with a fixed frame length and a retransmission mechanism utilizing frame numbering for non-transparent data transmission; a radio access network with a second link protocol provided with a retransmission mechanism for non-transparent data transmission, a frame length of the second protocol being variable or a frame thereof being longer than a frame of the first protocol; and an interworking unit via which the radio access network is connected to the mobile services switching centre such that a transmission link is provided between a mobile station and the mobile services switching centre via the radio access network, the transmission link comprising a first leg between the interworking unit and the mobile services switching centre and a second: leg between the mobile station and the interworking unit, wherein data is situated in information fields of the second link protocol frames in the form of data blocks which are numbered, the length of each of said data blocks equalling the length of an information field of the first link protocol frame, and the retransmission mechanism of the second link protocol is arranged to use said data block numbering between the interworking unit and the mobile station, said data block numbering being directly compatible with the frame numbering used between the interworking unit and the mobile services switching centre.

20. A mobile communication system comprising a mobile services switching centre with a first link protocol having a fixed frame length, provided with a retransmission mechanism for non-transparent data transmission; a radio access network with a second link protocol provided with a retransmission mechanism for non-transparent data transmission, a frame length of the second protocol being variable; and an interworking unit via which the radio access network is connected to the mobile services switching centre such that a transmission link is provided between a mobile station and the mobile services switching centre via the radio access network, the transmission link comprising a first leg between the interworking unit and the mobile services switching centre and a second leg between the mobile station and the interworking unit, wherein the mobile station and the interworking unit are arranged to transmit data in the information fields of the second link protocol frames in the form of data blocks which are numbered, and the length of each data block is such that the frame length of the second link protocol is equal to or smaller than a length of the first link protocol frame or information field, and the interworking unit and the mobile services switching centre are arranged to transmit the frames of the second link protocol in place of the frames of the first link protocol or in the information fields thereof between the interworking unit and the mobile services switching centre, and the mobile station and the mobile services switching centre are arranged to use said data block numbering in the retransmission mechanism of the second link protocol over an entire connection between the mobile station and the mobile services switching centre.

21. A mobile station configured to transmit and receive data in frames of a link protocol provided with a retransmission mechanism, wherein the data is placed in information fields of protocol frames in the form of fixed-length data blocks which are numbered, and said retransmission mechanism is arranged to utilize said data block numbering, and the length of each protocol frame can be changed during a connection, and the mobile station is arranged to insert the data blocks to be retransmitted into one or several protocol frames with a new frame length in response to the changing of the frame length, said data blocks having been transmitted for the first time before the frame length was changed and wherein the information field of each protocol frame comprises one or more data blocks and a header field of a protocol frame is provided with payload numbering indicating the data blocks contained in the information field of the protocol frame.

22. A mobile station according to claim 21, wherein the mobile station is arranged to acknowledge appropriately received data blocks, to request transmission of new data blocks, or to request retransmission of inappropriately received data blocks.

23. A mobile station according to claim 21, wherein said link protocol provided with a retransmission mechanism is a layer 2 link protocol or a protocol situated below a layer 2 link protocol.

24. A mobile station configured to transmit and receive data in frames of a link protocol provided with a retransmission mechanism, wherein the data is placed in information fields of protocol frames in the form of fixed-length data blocks which are numbered, and said retransmission mechanism is arranged to utilize said data block numbering, and the length of each protocol frame can be changed during a connection, and the mobile station is arranged to insert the data blocks to be retransmitted into one or several protocol frames with a new frame length in response to the changing of the frame length, said data blocks having been transmitted for the first time before the frame length was chanced, the mobile station being a dual-mode mobile station with ability to operate in two radio systems with different radio interfaces.

25. A mobile station configured to transmit and receive data in frames of a link protocol provided with a retransmission mechanism, wherein the data is placed in information fields of protocol frames in the form of fixed-length data blocks which are numbered, and said retransmission mechanism is arranged to utilize said data block numbering, and the length of each protocol frame can be changed during a connection, and the mobile station is arranged to insert the data blocks to be retransmitted into one or several protocol frames with a new frame length in response to the changing, of the frame length, said data blocks having been transmitted for the first time before the frame length was changed, and wherein the header of a protocol frame normally contains the payload number of one payload unit situated in the information field, and the header of the protocol frame contains the individual payload number of each payload unit in the information field when payload units with unsuccessive numbers are retransmitted in the protocol frame in a special situation.

* * * * *